(12) United States Patent
Hruska et al.

(10) Patent No.: US 10,744,586 B2
(45) Date of Patent: Aug. 18, 2020

(54) ENGINE DRIVEN WELDER

(71) Applicant: Lincoln Global, Inc., Santa Fe Springs, CA (US)

(72) Inventors: Adam M. Hruska, Chardon, OH (US); Justin M. Makosky, Hiram, OH (US); Edward A. Enyedy, Eastlake, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 347 days.

(21) Appl. No.: 15/823,878

(22) Filed: Nov. 28, 2017

(65) Prior Publication Data

US 2019/0160580 A1 May 30, 2019

(51) Int. Cl.
| | | |
|---|---|---|
| *B23K 9/10* | (2006.01) | |
| *B23K 37/00* | (2006.01) | |
| *B23K 9/32* | (2006.01) | |

(52) U.S. Cl.
CPC .............. *B23K 9/1006* (2013.01); *B23K 9/32* (2013.01); *B23K 37/003* (2013.01)

(58) Field of Classification Search
CPC ...... B23K 9/1006; B23K 9/32; B23K 37/003; F01P 1/06; F01P 7/02
USPC .......................... 219/133, 108, 130.33, 130.1
See application file for complete search history.

(56) References Cited

U.S. PATENT DOCUMENTS

| | | | |
|---|---|---|---|
| 2,604,501 | A | 7/1952 | Wightman |
| 3,749,953 | A | 7/1973 | Baumann et al. |
| 4,074,156 | A | 2/1978 | Windstrand et al. |
| 4,677,940 | A | 7/1987 | Bracht et al. |
| 4,702,201 | A | 10/1987 | Odo et al. |
| 4,757,221 | A | 7/1988 | Kurihashi et al. |
| 4,835,405 | A | 5/1989 | Clancey et al. |
| 5,093,591 | A | 3/1992 | Kitamura et al. |

(Continued)

FOREIGN PATENT DOCUMENTS

| | | |
|---|---|---|
| CN | 201940725 U | 8/2011 |
| EP | 0 125 834 A2 | 11/1984 |

(Continued)

OTHER PUBLICATIONS

Balmer; "High Output Marine DC Charging Systems;" Dated Jan. 2008; pp. 1-16.

(Continued)

*Primary Examiner* — Paul R Durand
*Assistant Examiner* — Robert K Nichols, II
(74) *Attorney, Agent, or Firm* — Brad C. Spencer

(57) ABSTRACT

A welding machine includes an enclosure and a welding power supply mounted in an electronics compartment within the enclosure. A divider wall at least partially defines an engine compartment. A generator is operatively connected to the power supply. An engine, located within the engine compartment, drives the generator. An engine-cooling fan is coupled to the engine. A recessed side vent is in fluid communication with the electronics compartment and recessed in a lateral side of the enclosure, and a recessed air channel is formed by the lateral side and extends rearward from the side vent along the engine compartment. The engine-cooling fan draws cooling air forward through the recessed side vent and into the electronics compartment, and downward through the electronics compartment and into the engine compartment.

20 Claims, 14 Drawing Sheets

(56) References Cited

U.S. PATENT DOCUMENTS

| | | |
|---|---|---|
| 5,575,349 A | 11/1996 | Ikeda et al. |
| 5,624,589 A | 4/1997 | Latvis et al. |
| 5,694,889 A | 12/1997 | Ball et al. |
| 5,751,079 A | 5/1998 | Bagherpour et al. |
| 5,861,604 A | 1/1999 | McLean et al. |
| 5,890,460 A | 4/1999 | Ball et al. |
| 5,899,174 A | 5/1999 | Anderson et al. |
| 5,928,535 A | 7/1999 | Trinkner et al. |
| 6,103,995 A | 8/2000 | Bankstahl |
| 6,109,310 A | 8/2000 | Peotter |
| 6,296,027 B1 | 10/2001 | Bender et al. |
| 6,331,740 B1 | 12/2001 | Morohoshi et al. |
| 6,472,635 B2 | 10/2002 | Trinkner et al. |
| 6,489,591 B1 | 12/2002 | Achtner |
| 6,491,133 B2 | 12/2002 | Yamada et al. |
| 6,499,441 B2 | 12/2002 | Suzuki |
| 6,520,124 B2 | 2/2003 | Bohm, II |
| 6,630,756 B2 | 10/2003 | Kern et al. |
| 6,644,923 B1 | 11/2003 | Fine et al. |
| 6,660,967 B2 | 12/2003 | Brofft et al. |
| 6,662,563 B1 | 12/2003 | Nordentoft |
| 6,670,580 B2 | 12/2003 | Brofft et al. |
| 6,707,181 B1 | 3/2004 | Militello et al. |
| 6,753,620 B2 | 6/2004 | Fukuda |
| 6,784,574 B2 | 8/2004 | Turner et al. |
| 6,917,121 B2 | 7/2005 | Akimoto |
| 6,927,511 B2 | 8/2005 | Cleanthous et al. |
| 7,023,101 B2 | 4/2006 | Wang |
| 7,049,707 B2 | 5/2006 | Wurtele |
| 7,080,611 B2 | 7/2006 | Chosei |
| 7,098,424 B2 | 8/2006 | Silvestro |
| 7,105,774 B2 | 9/2006 | Bender et al. |
| 7,107,943 B2 | 9/2006 | Yasuda et al. |
| 7,129,604 B1 | 10/2006 | Wang |
| 7,314,397 B2 | 1/2008 | Sodemann et al. |
| 7,492,050 B2 | 2/2009 | Brandenburg et al. |
| 7,557,458 B2 | 7/2009 | Yamamoto et al. |
| 8,153,924 B2 | 4/2012 | Salsich et al. |
| 8,186,314 B2 | 5/2012 | Brunelli et al. |
| 8,450,864 B2 | 5/2013 | Kawakita et al. |
| 8,552,340 B2 | 10/2013 | Laitala et al. |
| 9,040,869 B2 | 5/2015 | Salsich |
| 9,474,185 B2 | 10/2016 | Jochman |
| 9,793,779 B2 | 10/2017 | Heidebrink |
| 2004/0168654 A1 | 9/2004 | Radtke |
| 2004/0182846 A1 | 9/2004 | Silvestro |
| 2008/0061046 A1 | 3/2008 | Borowy et al. |
| 2008/0061047 A1 | 3/2008 | Borowy et al. |
| 2008/0061048 A1* | 3/2008 | Borowy .......... B23K 9/10 219/130.1 |
| 2008/0173376 A1 | 7/2008 | Bender et al. |
| 2008/0264919 A1 | 10/2008 | Helf et al. |
| 2010/0012636 A1 | 1/2010 | Jochman |
| 2010/0037837 A1 | 2/2010 | Yamasaki et al. |
| 2011/0175468 A1 | 7/2011 | Dutau |
| 2011/0214423 A1 | 9/2011 | Givens |
| 2013/0301689 A1 | 11/2013 | Marchand et al. |
| 2014/0154086 A1 | 6/2014 | Chung et al. |
| 2017/0149308 A1 | 5/2017 | Sayre et al. |
| 2017/0288496 A1 | 10/2017 | Paccou |
| 2017/0314561 A1 | 11/2017 | Jochman |
| 2019/0099824 A1* | 4/2019 | Taylor .......... F01P 1/06 |

FOREIGN PATENT DOCUMENTS

| | | |
|---|---|---|
| EP | 0 761 364 A2 | 3/1997 |
| EP | 1 887 197 A2 | 2/2008 |
| FR | 2 864 368 A1 | 6/2005 |
| GB | 2 225 490 A | 5/1990 |
| JP | H08-223884 A | 8/1996 |
| JP | H08-284662 A | 10/1996 |
| JP | 2001-20740 A | 1/2001 |
| JP | 2002-4857 A | 1/2002 |
| JP | 2005-188453 A | 7/2005 |
| JP | 2006-257961 A | 9/2006 |
| JP | 4594828 B2 | 12/2010 |
| WO | 2008/032414 A1 | 3/2008 |
| WO | 2010/009022 A1 | 1/2010 |

OTHER PUBLICATIONS

Miller Electric Mfg. Co.; "Bobcat 225 NT"; https://www.millerwelds.com/files/owners-manuals/O405_MIL.pdf; Dated Feb. 1997; pp. 1-65.

Miller Electric Mfg. Co.; "Trailblazer 300D NT"; https://www.millerwelds.com/files/owners-manuals/O487A_MIL.pdf; Dated Jan. 1998; pp. 1-49.

Lincoln Electric; "Ranger 9"; http://www.lincolnelectric.com/assets/servicenavigator-public/lincoln3/im753.pdf; Dated Jan. 2003; pp. 1-44.

Miller Electric Mfg. Co.; "Trailblazer 275 and 325"; Dated Jul. 2017; pp. 1-7.

* cited by examiner

ENGINE DRIVEN WELDER

BACKGROUND OF THE INVENTION

Field of the Invention

The present disclosure relates to engine driven generators, and in particular to engine driven arc generation devices, such as welders and plasma cutters.

Description of Related Art

Engine driven welders include an internal combustion engine, such as a diesel, gasoline or liquefied petroleum gas (LPG) engine. The engine drives a generator, and the generator supplies electrical power to a welding power supply that outputs a welding current and voltage. A compact design for an engine driven welder is often desirable. However, it can be difficult to maximize the machine's fuel storage capacity when a compact design is employed. For example, space for the fuel tank will be limited, and various obstructions in the structural chassis that occupy potential fuel tank space may be present. A compact design for an engine driven welder that maximizes fuel storage capacity would be beneficial. Air vents for cooling the engine and generator are typically found on one or more exterior surfaces of the machine. However, such vents can be points of entry for debris or other contaminants, such as water (e.g., in the form of precipitation). If the vents become blocked or otherwise clogged, cooling efficiency is reduced and could lead to overheating. Thus, it is desirable to limit the likelihood of introducing contaminants into the engine driven welder through the air vents, while also limiting the likelihood of the vents becoming blocked.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a welding machine. The welding machine includes in enclosure. A welding power supply is mounted in an electronics compartment within the enclosure. A divider wall at least partially defines an engine compartment of the welding machine rearward of the electronics compartment. A generator is operatively connected to the welding power supply to supply electrical energy to the welding power supply. An internal combustion engine is located within the engine compartment and is configured to drive the generator. An engine-cooling fan is coupled to the engine. A first recessed side vent is in fluid communication with the electronics compartment and is recessed in a first lateral side of the enclosure, and a first recessed air channel is formed by the first lateral side of the enclosure and extends rearward from the first recessed side vent along the engine compartment. A second recessed side vent is in fluid communication with the electronics compartment and is recessed in a second lateral side of the enclosure, and a second recessed air channel is formed by the second lateral side of the enclosure and extends rearward from the second recessed side vent along the engine compartment. The engine-cooling fan draws cooling air forward through the first and second recessed side vents and into the electronics compartment, and downward through the electronics compartment and into the engine compartment.

In certain embodiments, the welding machine includes a generator-cooling fan coupled to the generator, a rear vent in fluid communication with the generator and located on a rear side of the enclosure, and a baffle at least partially surrounding the muffler, wherein the generator-cooling fan draws further cooling air forward into the enclosure through the rear vent, and the baffle directs an air flow of the further cooling air away from the muffler. In certain embodiments, the welding machine further comprises a cantilevered engine-mounting shelf cantilevered from the divider wall, wherein the internal combustion engine is attached to the cantilevered engine-mounting shelf, and comprises a fuel tank mounted within the enclosure and located beneath each of the cantilevered engine-mounting shelf, the internal combustion engine, and the generator. In certain embodiments, the welding power supply includes a heat sink aligned with at least one of the first recessed side vent and the second recessed side vent. In certain embodiments, the enclosure includes a first engine compartment access door located beneath the first recessed air channel, and a second engine compartment access door located beneath the second recessed air channel. In certain embodiments, the divider wall is located between the internal combustion engine and a starting battery for starting the internal combustion engine, and the divider wall separates the engine compartment from a battery compartment storing the starting battery. In further embodiments, the welding machine includes a removable battery compartment cover for providing access to the battery compartment, wherein the battery compartment cover is located on a front side of the welding machine.

In accordance with another aspect, provided is a welding machine. The welding machine includes an enclosure. A welding power supply is mounted in an electronics compartment within the enclosure. A divider wall at least partially defines an engine compartment of the welding machine rearward of the electronics compartment. A generator is operatively connected to the welding power supply to supply electrical energy to the welding power supply. An internal combustion engine is located within the engine compartment and is configured to drive the generator. The welding machine includes a muffler. An engine-cooling fan is coupled to the engine for drawing a first cooling air flow into the enclosure. A generator-cooling fan is coupled to the generator for drawing a second cooling air flow into the enclosure. A first recessed side vent is in fluid communication with the electronics compartment and is recessed in a first lateral side of the enclosure, and a first recessed air channel is formed by the first lateral side of the enclosure and extends rearward from the first recessed side vent along the engine compartment. A second recessed side vent is in fluid communication with the electronics compartment and is recessed in a second lateral side of the enclosure, and a second recessed air channel is formed by the second lateral side of the enclosure and extends rearward from the second recessed side vent along the engine compartment. A further vent is in fluid communication with the generator. A baffle is located in the engine compartment adjacent to the muffler. The engine-cooling fan draws the first cooling air flow forward through the first and second recessed side vents and into the electronics compartment, and downward through the electronics compartment and into the engine compartment thereby cooling each of the welding power supply, the engine, and the muffler. The generator-cooling fan draws the second cooling air flow into the enclosure through the further vent. The baffle directs the second cooling air flow away from the muffler.

In certain embodiments, the baffle at least partially surrounds the muffler. In certain embodiments, the welding machine further comprises a cantilevered engine-mounting shelf cantilevered from the divider wall, wherein the internal combustion engine is attached to the cantilevered engine-mounting shelf, and comprises a fuel tank mounted within the enclosure and located beneath each of the cantilevered engine-mounting shelf, the internal combustion engine, and the generator. In certain embodiments, the welding power supply includes a heat sink aligned with at least one of the first recessed side vent and the second recessed side vent. In certain embodiments, the enclosure includes a first engine compartment access door located beneath the first recessed air channel, and a second engine compartment access door located beneath the second recessed air channel. In certain embodiments, the divider wall is located between the internal combustion engine and a starting battery for starting the internal combustion engine, and the divider wall separates the engine compartment from a battery compartment storing the starting battery. In further embodiments, the welding machine includes a removable battery compartment cover for providing access to the battery compartment, wherein the battery compartment cover is located on a front side of the welding machine.

In accordance with another aspect, provided is an electrical power generation apparatus. The apparatus includes an arc generation power supply mounted in an electronics compartment of the apparatus. A generator is operatively connected to the arc generation power supply to supply electrical energy to the arc generation power supply. An internal combustion engine is configured to drive the generator. An enclosure, including a chassis structure comprising a divider wall, at least partially defines an engine compartment of the apparatus. A cantilevered engine-mounting shelf is cantilevered from the divider wall. The internal combustion engine is attached to the cantilevered engine-mounting shelf. A fuel tank is mounted within the chassis structure and is located beneath each of the cantilevered engine-mounting shelf, the internal combustion engine, and the generator. An engine-cooling fan is coupled to the internal combustion engine for drawing a cooling air flow into the enclosure. A recessed side vent is in fluid communication with the electronics compartment and is recessed in a lateral side of the enclosure. The engine-cooling fan draws cooling air forward through the recessed side vent and into the electronics compartment, and downward through the electronics compartment and into the engine compartment.

In certain embodiments, the arc generation power supply includes a heat sink aligned with the recessed side vent. In certain embodiments, the divider wall is located between the internal combustion engine and a starting battery for starting the internal combustion engine, and the divider wall separates the engine compartment from a battery compartment storing the starting battery. In further embodiments, the electrical power generation apparatus includes a removable battery compartment cover for providing access to the battery compartment, wherein the battery compartment cover is located on a front side of the apparatus, and the electronics compartment is located above the battery compartment. In certain embodiments, the electrical power generation apparatus includes a vibration isolator that isolates the cantilevered engine-mounting shelf from the divider wall, wherein the internal combustion engine and cantilevered engine-mounting shelf apply a radial load to the vibration isolator. In certain embodiments, the electrical power generation apparatus includes a recessed air channel, formed by the lateral side of the enclosure, and extending rearward from the recessed side vent along the engine compartment. In further embodiments, the enclosure includes an engine compartment access door located beneath the recessed air channel.

DETAILED DESCRIPTION OF THE INVENTION

Figure 1:
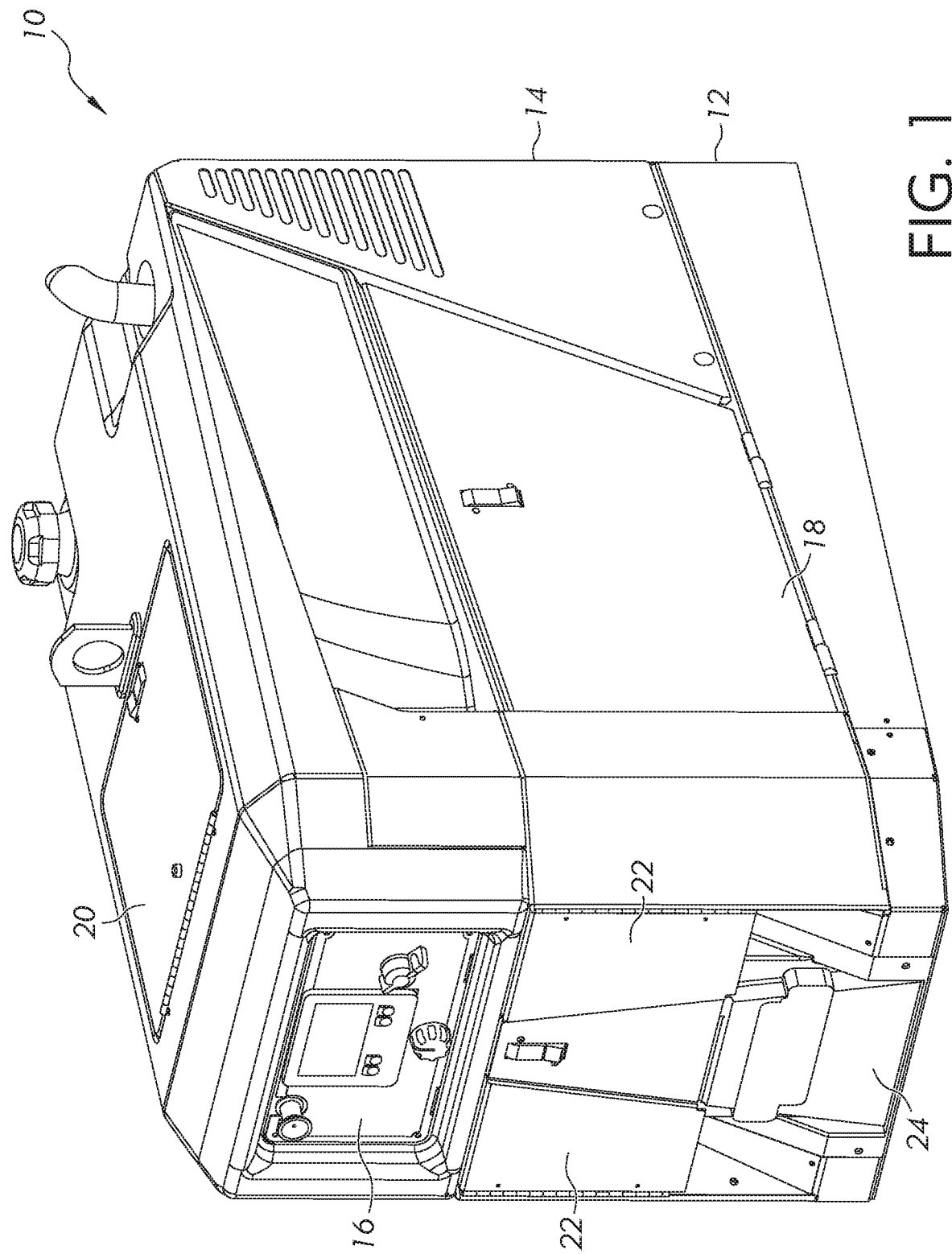
FIG. 1 is a perspective view of an engine driven welder.

Embodiments of the present disclosure relate to engine driven welders. The embodiments will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

FIG. 1 is an outer perspective view of an example engine driven electrical power generation apparatus. The electrical power generation apparatus will be described in the context of a welding machine 10. However, it will be appreciated that aspects of the present disclosure are not limited to welding machines and would be applicable to other types of electrical power generation devices, such as standby generators, engine driven plasma cutters, and the like.

The welding machine 10 includes a base 12 that is part of a chassis structure for the welding machine, and an outer case or enclosure 14. A user interface 16 for controlling the operation of the welding machine 10 is located on the front side of the outer case 14. Example welding processes that can be performed by the welding machine include shielded metal arc welding (SMAW), gas metal arc welding (GMAW), flux-cored arc welding (FCAW), gas tungsten arc welding (GTAW), and gouging.

The case 14 includes various access doors. Doors 18 along the left and right lateral sides of the welding machine 10 provide access to an engine compartment. In certain embodiments, the doors 18 are hinged at their bottom edges, allowing the doors 18 to swing downward. The doors 18 can be easily removable from the hinges, so that they can be relocated away from the welding machine 10 when accessing the engine compartment. A door 20 on the top of the welding machine 10 also provides access to the engine compartment. The top door 20 can be aligned with an air filter housing for the engine, so that the air filter can be readily inspected and replaced.

One or more doors 22 on the front side of the welding machine 10 provide access to various electrical outputs of the welding machine. For example, auxiliary power receptacles and welding torch connections can be accessed via the doors 22 on the front of the welding machine 10.

Figure 2:
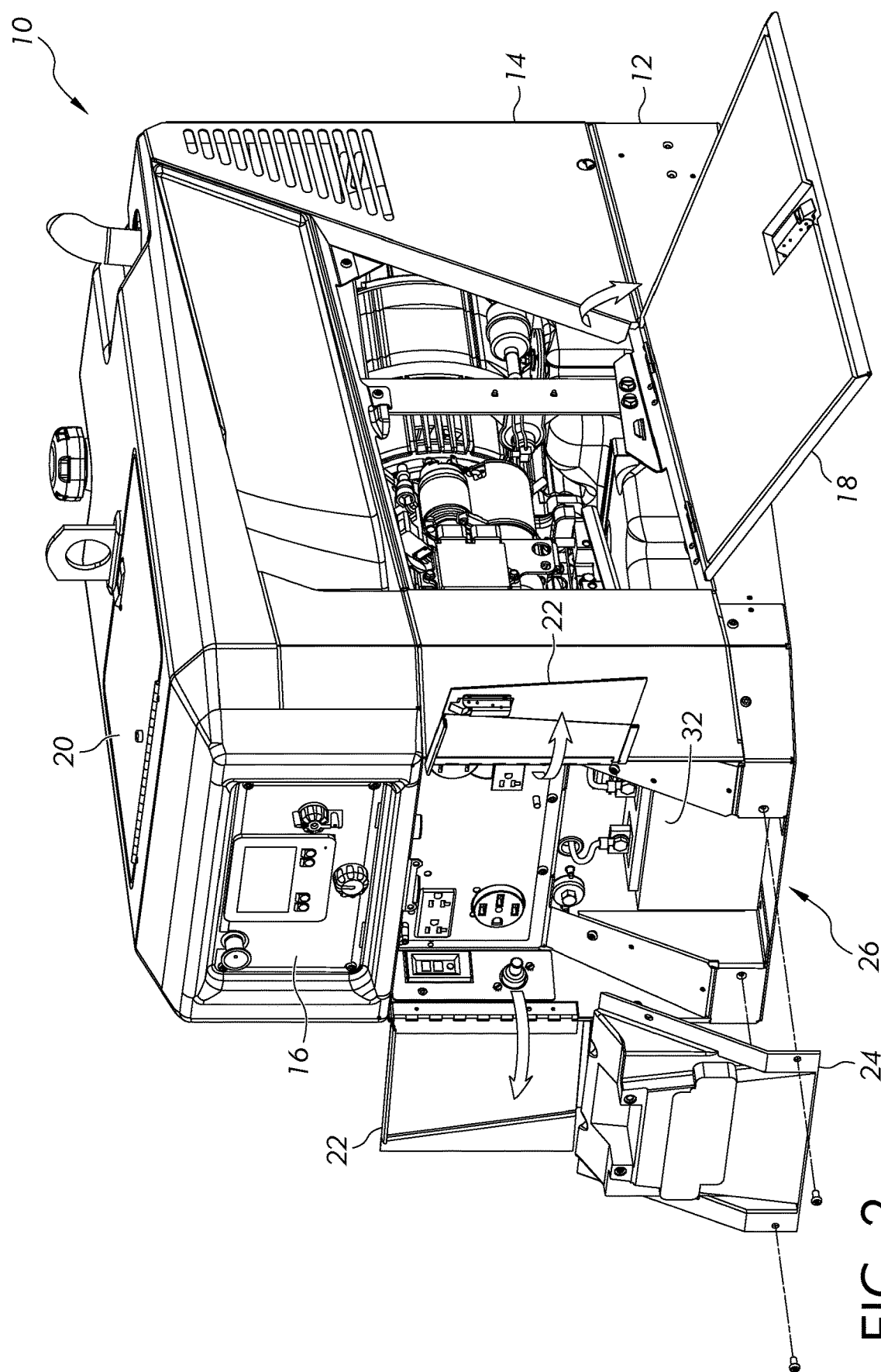
FIG. 2 is a perspective view of the engine driven welder.

Beneath the doors 22 on the front side of the welding machine is a removable battery compartment cover 24. The battery compartment cover 24 is shown in an unattached, open position in FIG. 2 (e.g., unscrewed from the outer case 14). A starting battery 32 for starting the engine is stored in the battery compartment 26. The battery compartment 26 is located at the front of the welding machine 10. The starting battery is readily accessible directly from the front of the welding machine 10 by removing the cover 24, allowing the battery to be serviced (e.g., charged) or replaced. In certain embodiments, the battery compartment cover 24 can be hinged to the base 12 or case 14 to form a hinged door.

Figure 3:
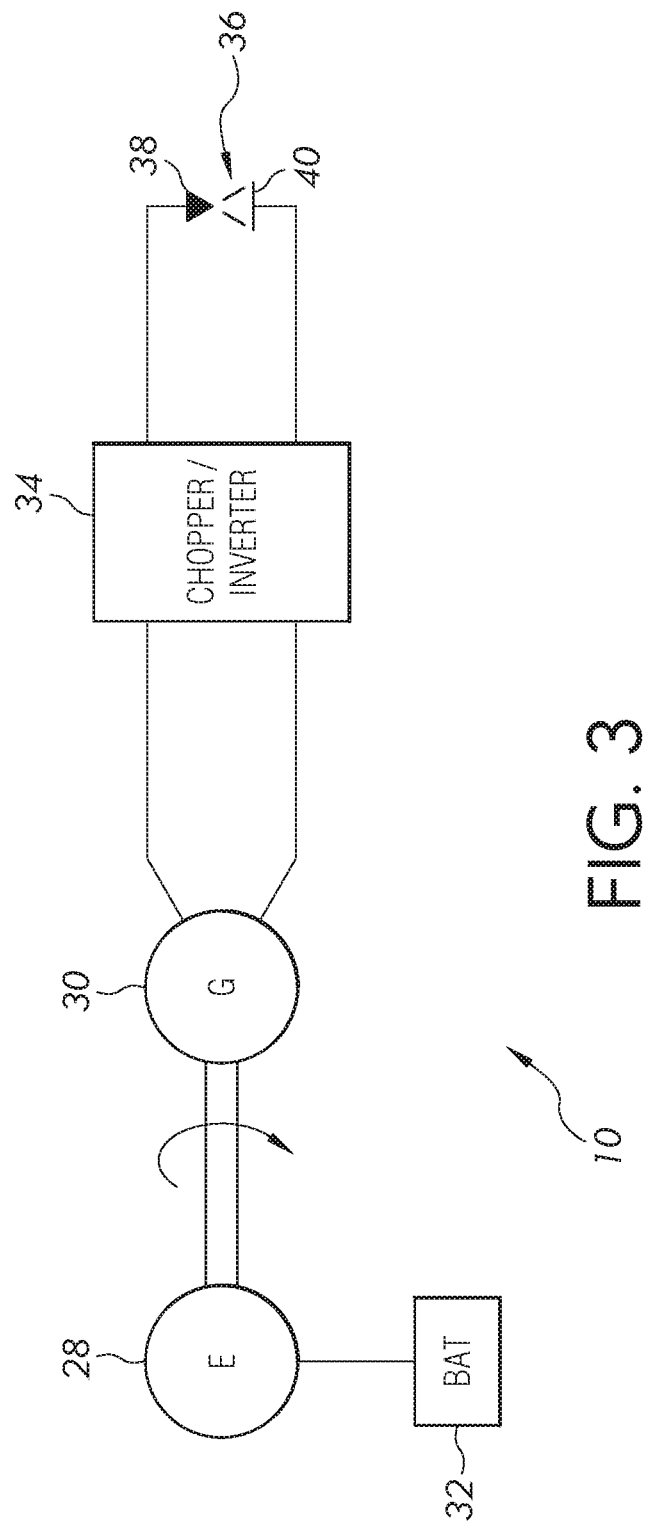
FIG. 3 is a block diagram of the engine driven welder.
Figure 4:
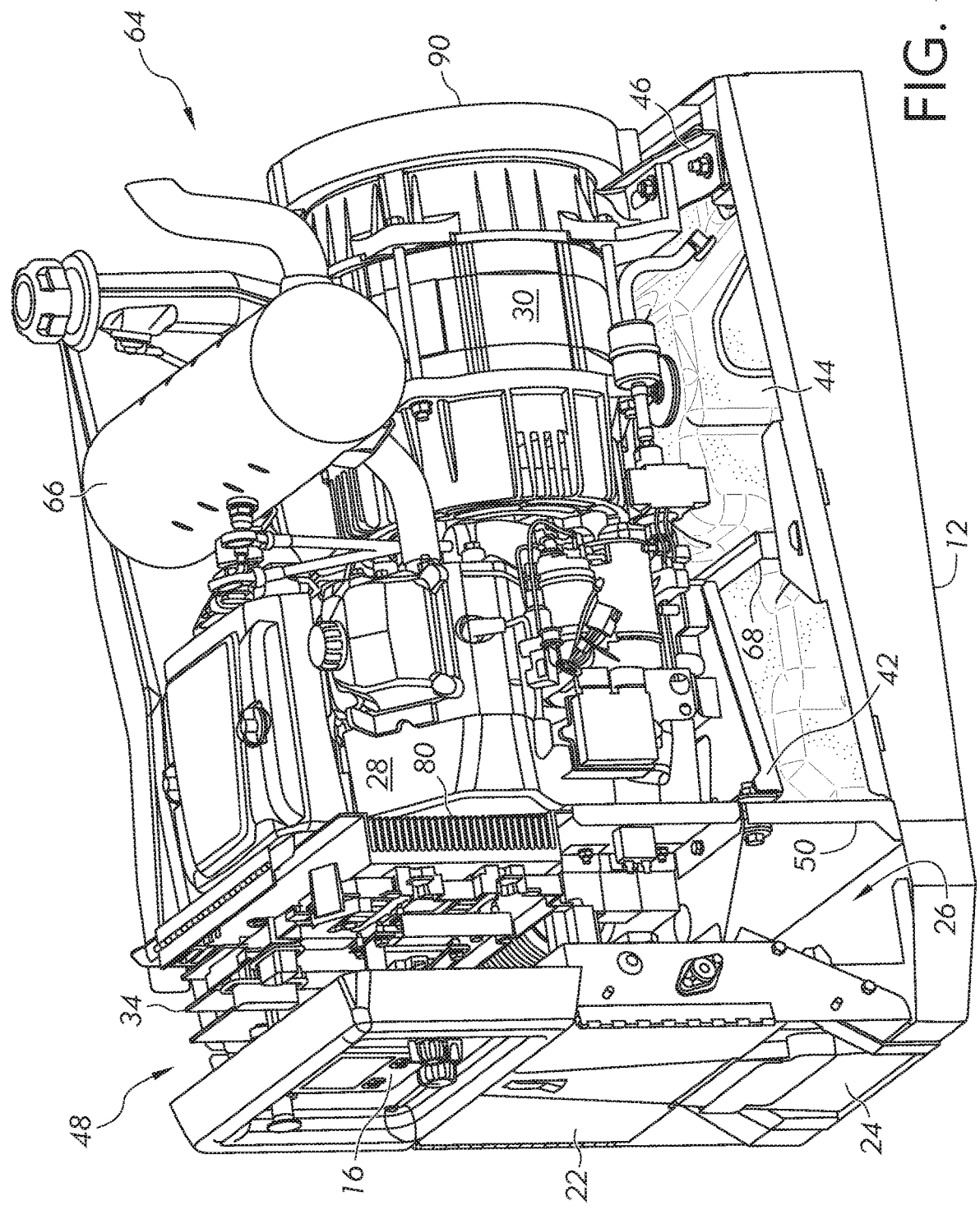
FIG. 4 is an internal view of the engine driven welder.
Figure 5:
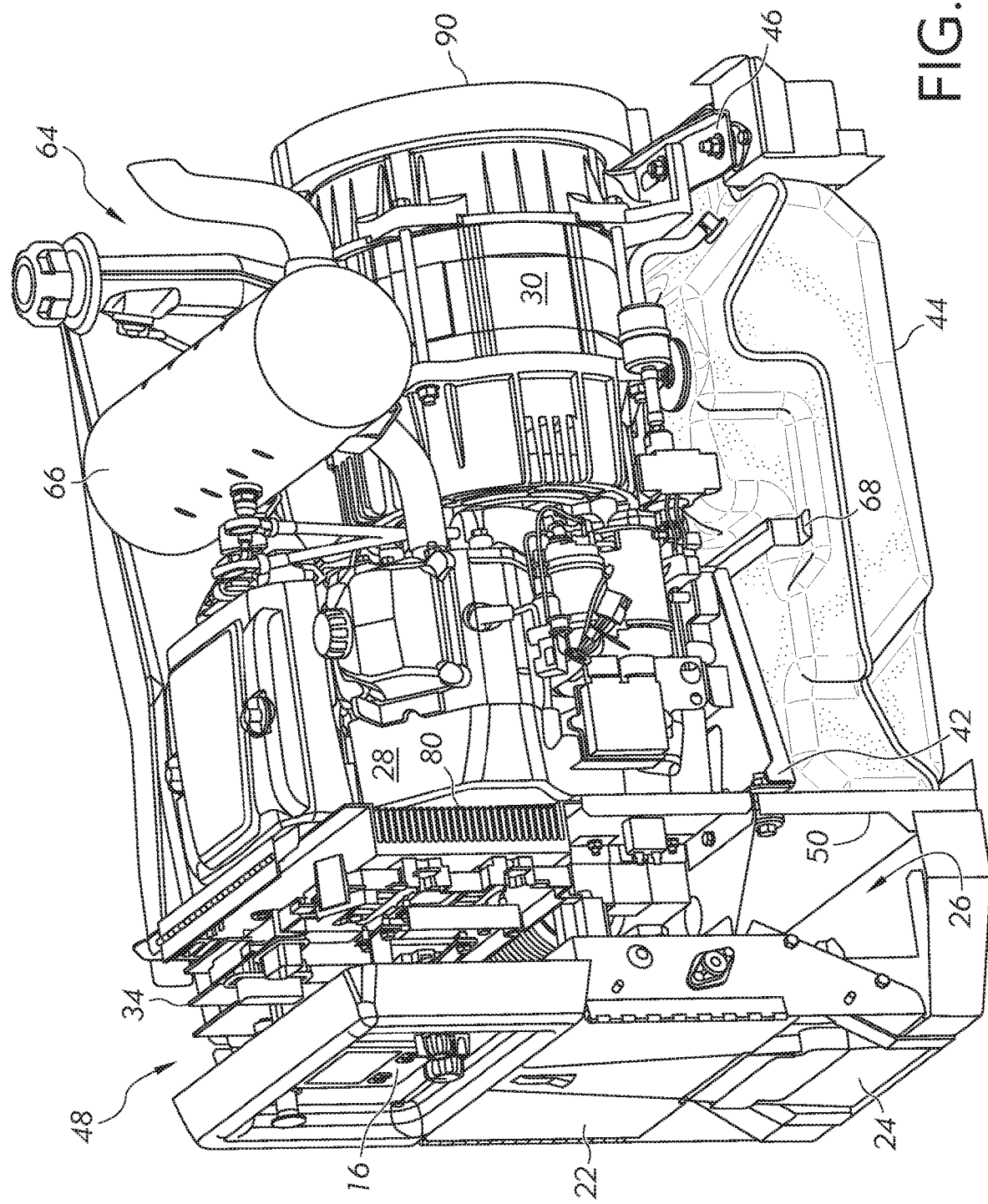
FIG. 5 is an internal view of the engine driven welder.
Figure 6:
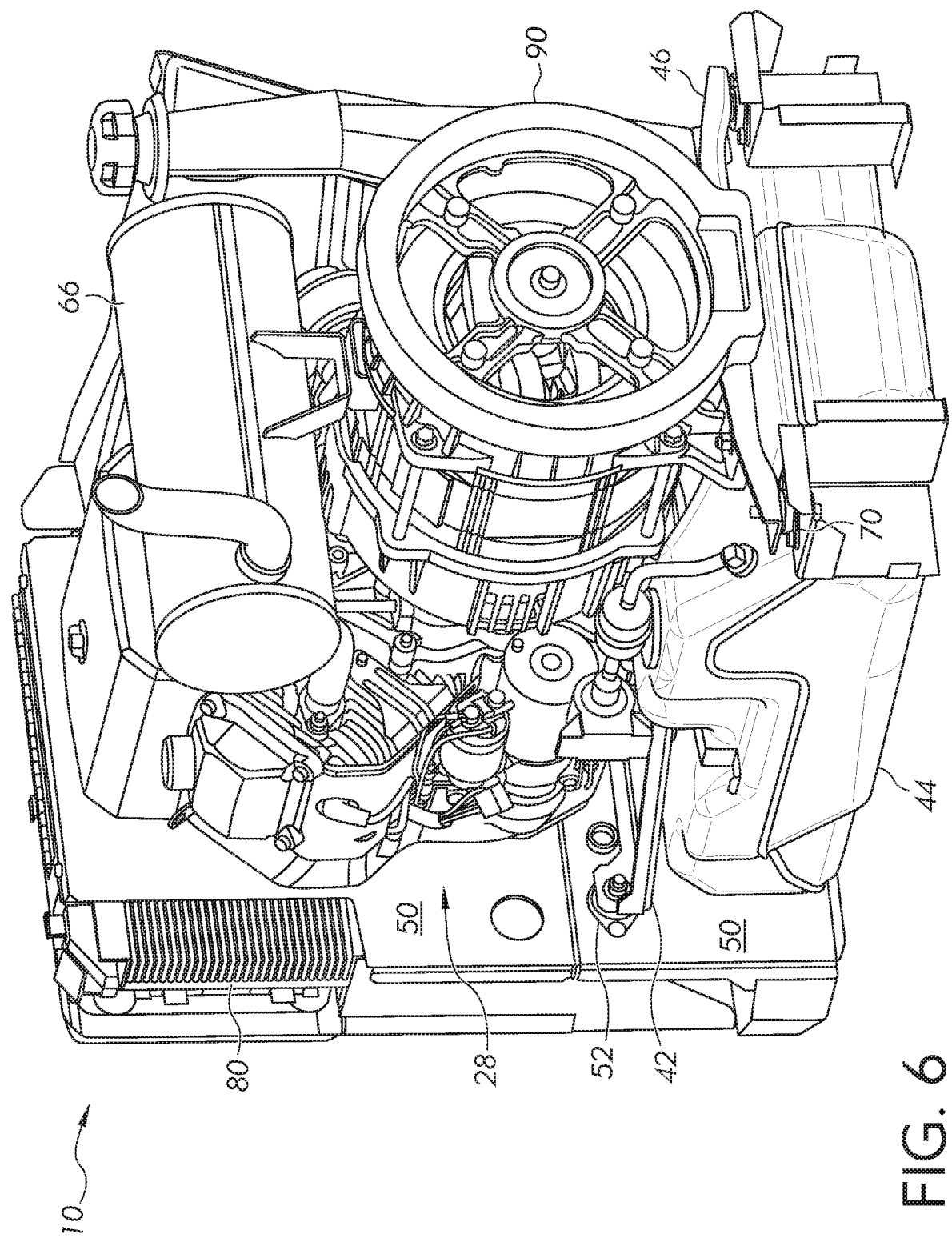
FIG. 6 is an internal view of the engine driven welder.
Figure 7:
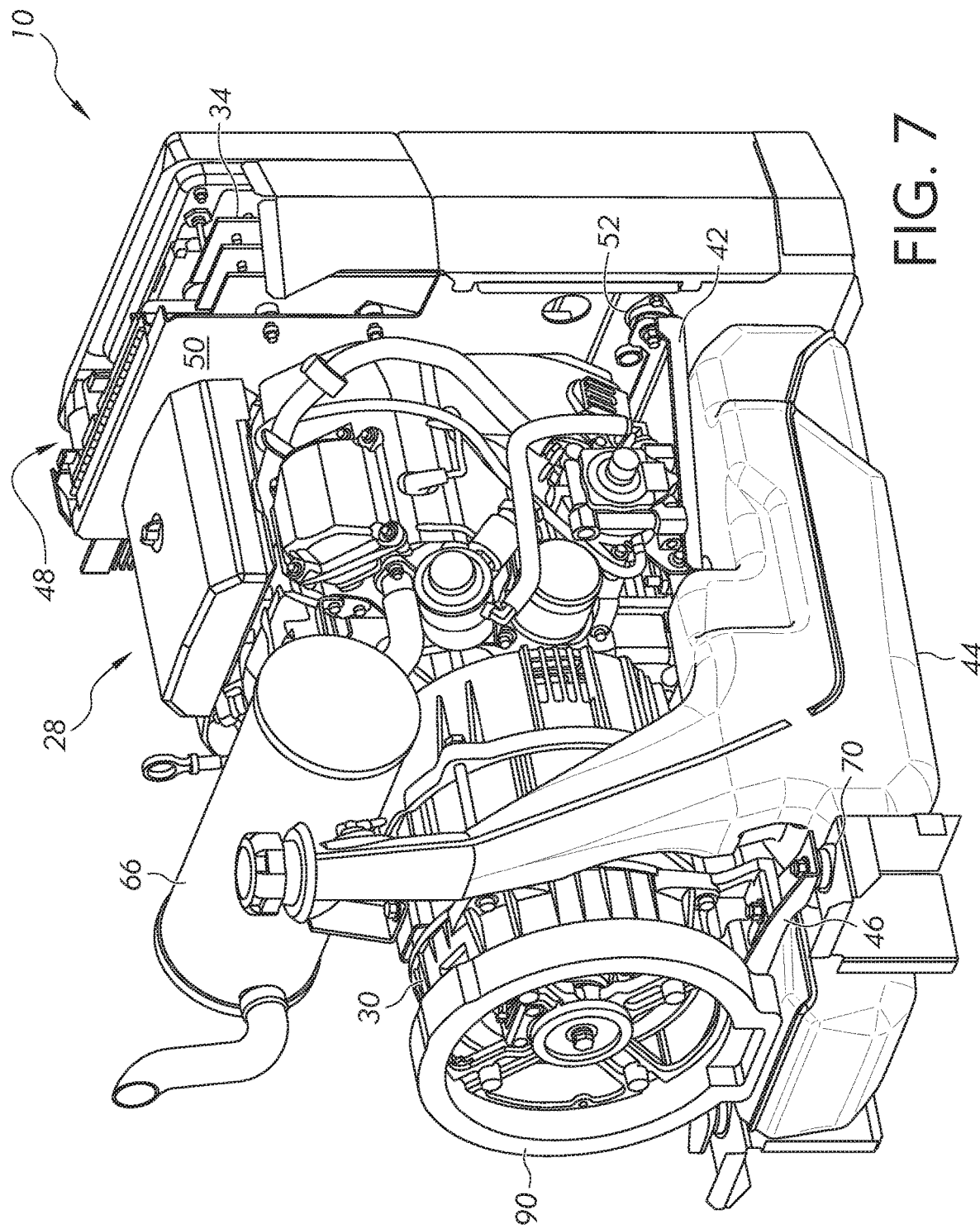
FIG. 7 is an internal view of the engine driven welder.

FIG. 3 is a schematic block diagram of the welding machine 10. An internal combustion engine 28 is coupled to a generator 30 to drive the generator. The engine 28 and generator 30 can be mounted in-line and coaxially coupled so that they operate at the same rotational speed, or coupled via a speed-altering device, such as a pulley or gear system. The starting battery 32 is operatively connected to a starter motor of the engine 28 and is accessible from the front of the welding machine 10 as discussed above. The generator 30 is operatively connected to an arc generation power supply, such as a welding power supply 34, and supplies electrical energy to the welding power supply. The generator 30 can be an AC or DC generator, as desired. The welding power supply 34 converts the electrical energy from the generator 30 to a welding output for generating a welding arc 36 between a torch 38 and workpiece(s) 40 to be welded. The welding power supply 34 can include a chopper or inverter circuitry for generating the welding output, control circuitry for controlling the chopper or inverter circuitry, and may include a transformer and one or more rectifiers. The welding power supply 34 can further include heat sinks to help cool the welding power supply, such as by air pulled into the welding machine by a fan powered by the engine or generator. The specific construction of arc generation power supplies, such as welding power supplies, is well known to one of ordinary skill in the art and will not be discussed in detail herein.

FIGS. 4-7 provide internal views of the welding machine 10. As will be explained in detail below, the welding machine 10 includes an engine-mounting shelf 42 or bracket that is cantilevered from an internal wall or bulkhead of the machine's chassis structure. Cantilevering the engine-mounting shelf 42 removes the engine's mounting system from the bottom of the chassis structure and frees up space for maximizing the size of the fuel tank 44. The engine's mounting system does not intrude into usable fuel tank volume within the engine compartment. The fuel tank 44 is mounted within the chassis structure and extends from a point just behind the battery compartment 26 to the rear of the welding machine 10, and the fuel tank 44 is located beneath the engine 28, the engine-mounting shelf 42, the generator 30 and a mounting bracket 46 for the generator.

Figure 8:
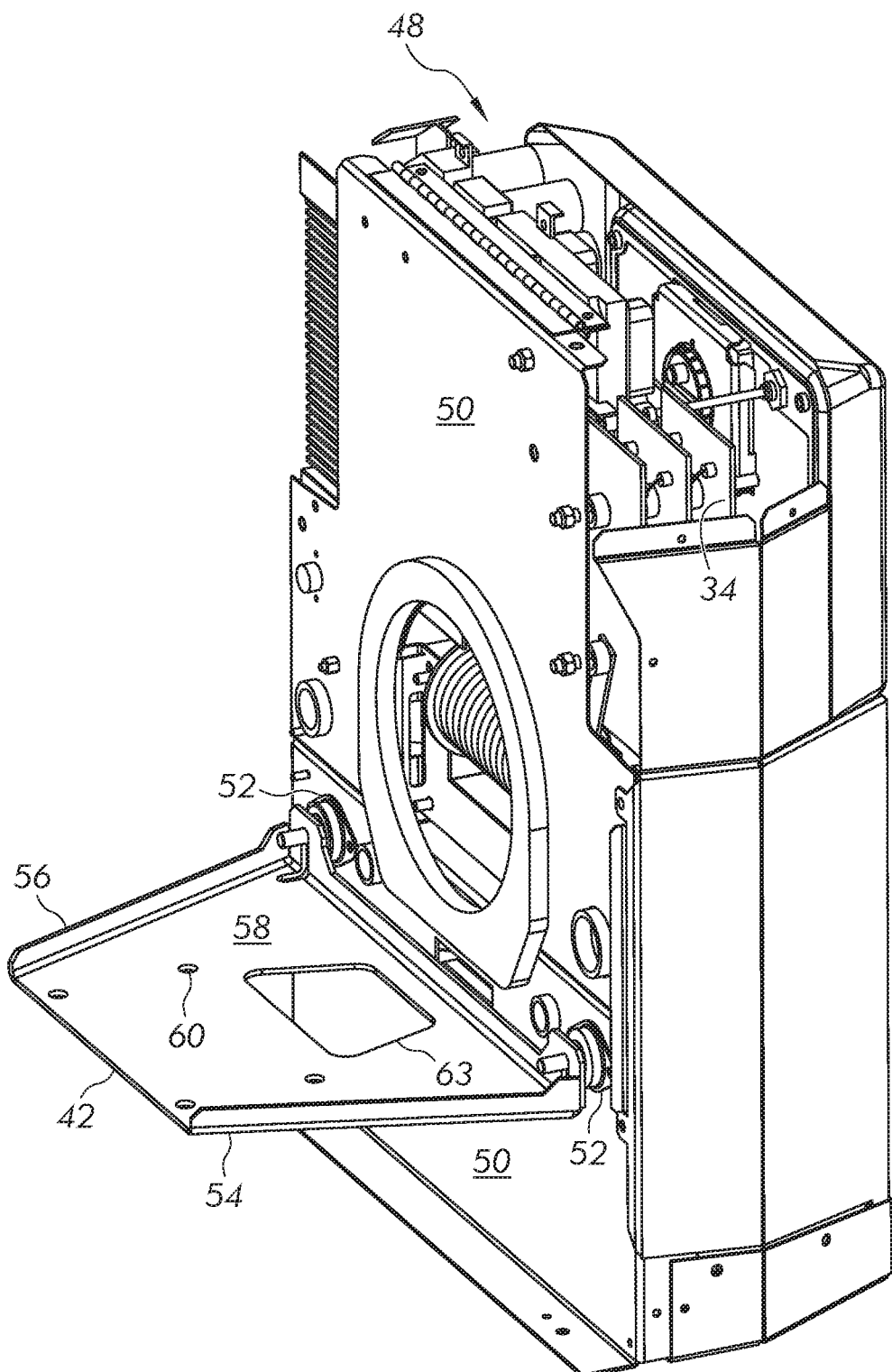
FIG. 8 shows an engine-mounting shelf of the engine driven welder.
Figure 9:
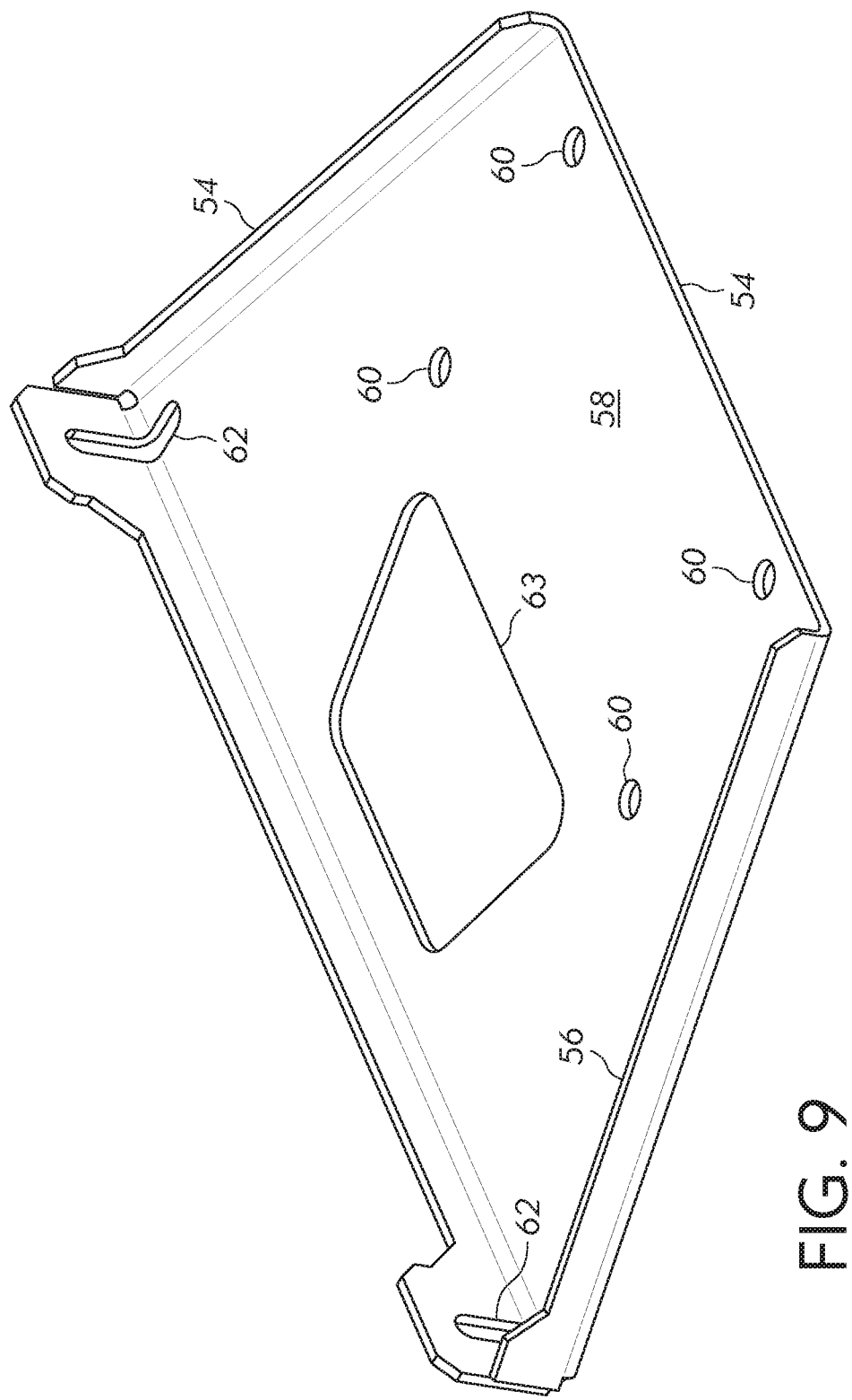
FIG. 9 shows the engine-mounting shelf of the engine driven welder.

The engine-mounting structure is shown in detail in FIG. 8, and the engine-mounting shelf 42 is shown in FIG. 9. The engine compartment of the welding machine, containing the engine, fuel tank, muffler, and generator, is located at the rear of the welding machine, and is separated from the battery compartment 26, and separated from an electronics compartment 48 containing the welding power supply, by a divider wall 50 or bulkhead. Thus, the divider wall 50 is located between the internal combustion engine and the starting battery and welding power supply. The engine-mounting shelf 42 is cantilevered from the divider wall 50 and is mounted on vibration isolators 52 (e.g., elastomeric isolators). The engine-mounting shelf 42 projects horizontally rearward into the engine compartment from the divider wall 50, and the engine-mounting shelf is isolated from the divider wall and chassis structure by the vibration isolators 52. Conventional vibration isolators are typically axially loaded (i.e., the load is borne along the axis of the vibration isolator). However, in the shown embodiment, the vibration isolators 52 for the engine-mounting shelf 42 are radially loaded (i.e., the engine and engine-mounting shelf 42 apply a load to the vibration isolators in a radial direction of the vibration isolator, rather than along its axis). The engine-mounting shelf 42 shown in the drawings is supported by two vibration isolators 52. However, additional vibration isolators, such as three, four, or more than four, could be used as necessary or desired.

It can be seen that the engine-mounting shelf 42 in the illustrated embodiment has a trapezoidal shape. The engine-mounting shelf 42 need not have a trapezoidal shape and could have a square or rectangular shape for example. However, the trapezoidal shape provides the advantages of reduced torque/force on the vibration isolators 52 and the fasteners extending therethrough, while reducing the weight of the engine-mounting shelf 42. Locating the vibration isolators 52 far apart on the divider wall 50 helps to minimize the side-to-side rocking of the engine. The trapezoidal shape of the shelf 42 reduces the weight of the shelf by narrowing it near the engine mounts. It can be seen that the nonparallel sides 54, 56 of the engine-mounting shelf 42 extend away from the divider wall and converge, and would extend into the engine compartment of the welding machine. The edges of the nonparallel sides 54, 56 of the engine-mounting shelf 42 are upturned to form strengthening flanges that extend vertically away from the upper surface 58 of the shelf. Alternatively, the edges can extend downwards to form the strengthening flanges. In either case, the strengthening flanges stiffen the shelf 42 to support the weight of the engine. The engine is mounted to the upper surface 58 of the engine-mounting shelf 42. The engine-mounting shelf 42 can include holes 60 for fasteners to secure the engine to the shelf, and slots 62 for hanging the shelf from the vibration isolators 52. To reduce the weight of the engine-mounting shelf 42, or to allow air to flow through the shelf, the shelf can include one or more cutout portions 63.

Returning to FIGS. 4-7, the welding power supply 34 is located in the electronics compartment 48, forward of the divider wall 50 and above the battery compartment 26.

Behind the electronics and battery compartments, rearward of the divider wall 50, is the engine compartment 64, which occupies the majority of the interior volume of the welding machine 10. Among other things, the engine compartment 64 contains the engine 28, generator 30, muffler 66 and fuel tank 44. The engine 28 is mounted forward of the generator 30 on the engine-mounting shelf 42. The generator 30 can be mounted to a generator-mounting bracket 46 that is attached to the chassis structure at a rear portion of the welding machine 10. In an example embodiment, the generator-mounting bracket 46 is a bridge bracket that is attached to the chassis structure at the left and right sides of the chassis structure, near the rear corners of the chassis structure, and the generator is secured to the center portion of the "bridge" formed by the bridge bracket. Alternatively, the generator 30 could be mounted to another cantilevered shelf, similar to the engine 28. Vibration isolators 70 can be used to isolate the generator 30 and bridge bracket 46 from the chassis structure. The vibration isolators 70 for the generator 30 and bridge bracket 46 are axially loaded, unlike the vibration isolators 52 for the engine-mounting shelf.

At the bottom of the chassis structure nestled within the base 12 is the fuel tank 44. The base is not shown in FIGS. 5-7 to better expose the fuel tank 44. The base 12 can form a pan for holding the fuel tank 44 by having raised sides and having a generally planar bottom surface. In certain embodiments, the sides of the base 12 and/or its generally planar bottom surface can include locating protrusions that engage corresponding indentations in the fuel tank 44, to limit side-to-side and/or forward-to-backward movement of the fuel tank within the base. The welding machine 10 can also include a fuel tank strap 68 (FIG. 4) that is attached to the chassis structure and passes over the top of the fuel tank 44, to prevent upward movement of the fuel tank within the chassis.

The fuel tank 44 can occupy nearly the entire floor space of the engine compartment 64 formed by the base 12. The fuel tank 44 can extend from the divider wall 50 to a point rearward of the generator-mounting bracket 46. The fuel tank 44 can occupy such a considerable amount of the floor space of the engine compartment 64 because the mounting system for the engine 28 does not intrude into the floor space. Thus, the fuel tank 44 can be located beneath each of the engine-mounting shelf 42, the engine 28, the generator 30, the generator-mounting bracket 46 and the muffler 66. The base 12 of the chassis structure has raised side walls, a raised rear wall, and a forward wall formed by the divider wall 50, and the fuel tank 44 can extend substantially to each of these four walls. Further, the engine 28 and generator 30 need not be supported by the fuel tank 44, but rather can be borne by their respective support structures (e.g., engine-mounting shelf 42 and bracket 46 and associated vibration isolators) and held just above the fuel tank.

The fuel tank 44 can include an upwardly-projecting filler tube having a cap that is accessible from the exterior of the outer case 14 of the welding machine 10.

Figure 10:
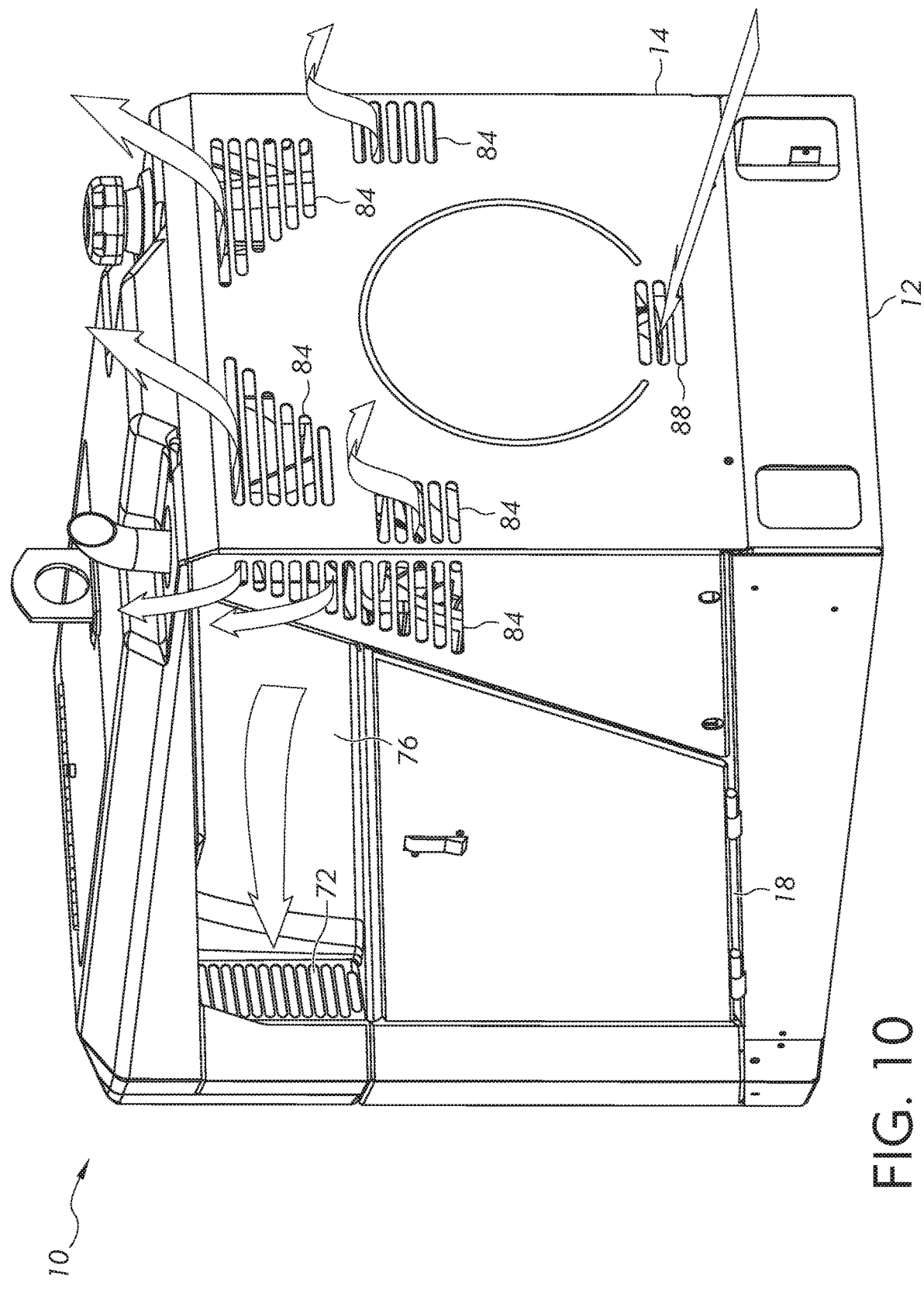
FIG. 10 is a rear perspective view of the engine driven welder.
Figure 11:
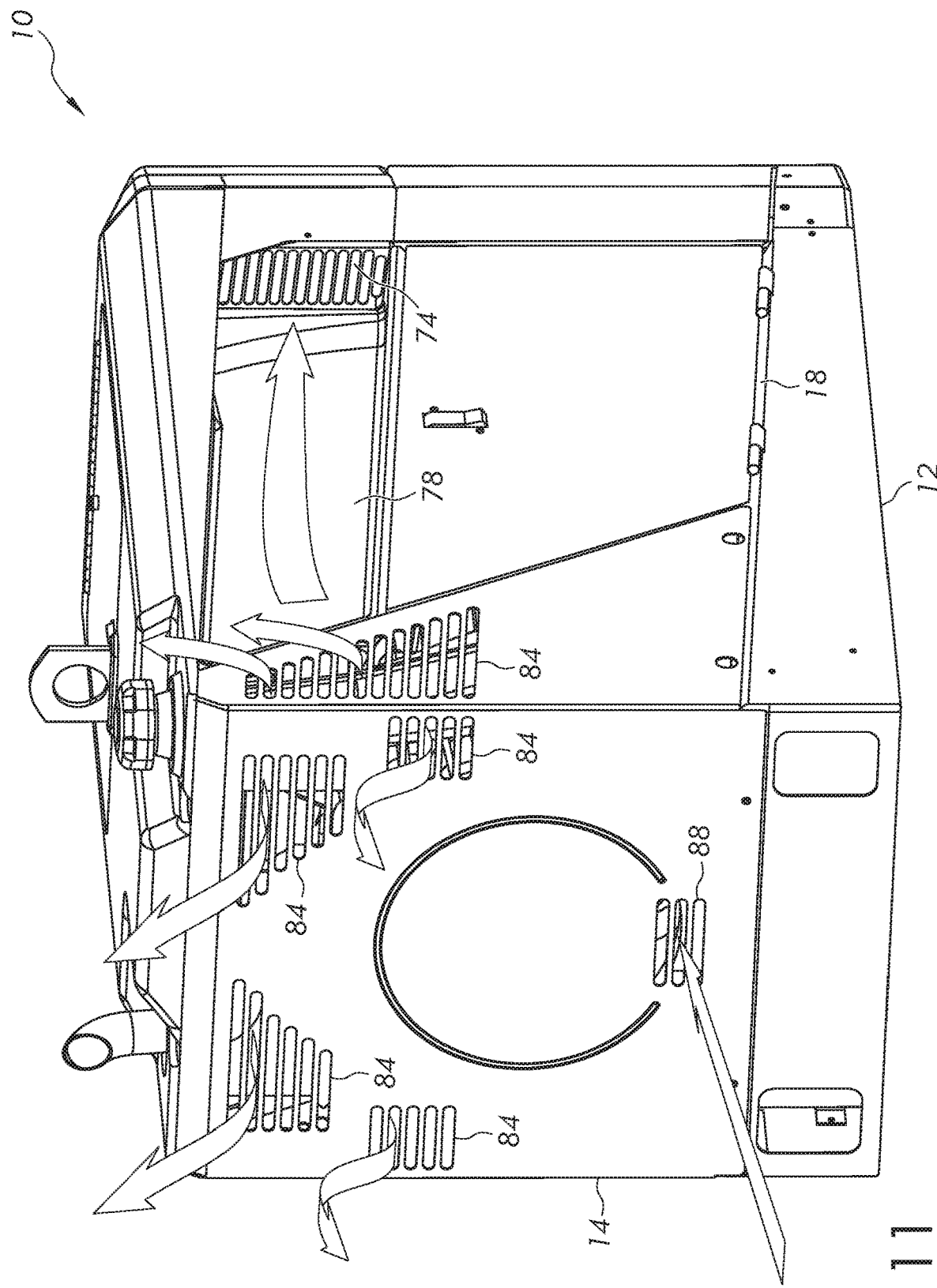
FIG. 11 is a rear perspective view of the engine driven welder.

FIGS. 10 and 11 are rear perspective views of the welding machine 10. The welding machine 10 includes recessed side air intake vents 72, 74, which are recessed into the right and left lateral sides of the machine. The vents 72, 74 can be covered by slotted vent guards (grating, louvers, etc.) having a number of openings that allow air to enter the enclosure 14 while preventing finger access. The vents 72, 74 are located toward the front of the enclosure 14 and are open to and in fluid communication with the electronics compartment 48, to cool the electronics compartment and, in particular, to cool the welding power supply 34. The vents 72, 74 can be oriented generally parallel to the front and rear sides of the enclosure 14, or oriented at an acute angle with respect to the front and rear sides. In either orientation, cooling air is drawn through the vents 72, 74 in a generally forward direction (from back to front) into the electronics compartment 48.

The right and left lateral sides of the enclosure 14 include recessed air channels 76, 78 that extend rearward from the vents 72, 74 along the sides of the enclosure (e.g., along the engine compartment). The depth of the air channels 76, 78 can increase from back to front in a linear or non-linear fashion, so that the air channels are tapered. The recessed vents 72, 74 and air channels 76, 78 are less likely to be obstructed when the welding machine 10 is placed close to another object, as compared to vents located directly on a side surface of the machine. Moreover, the effective open area provided by the recessed vents 72, 74 can be made larger than conventional stamped louvered vents located on a side surface of the machine. Large intake vents 72, 74 provide a slower air flow, which reduces noise and the decreases the likelihood of drawing contaminants into the enclosure 14.

The recessed side vents 72, 74 and air channels 76, 78 are located well above the base 12, and can be located high on the machine, such as in the upper one-third or upper one-quarter of the machine's height, or lower, such as in the upper two-thirds or upper one-half of the machine's height. In the embodiment shown in the drawings, the recessed side vents 72, 74 and air channels 76, 78 are located above the engine compartment access doors 18 in an upper portion of the welding machine 10. The electronics compartment 48 is also located in an upper portion of the welding machine 10, above the battery compartment 26. Locating the side air intake vents 72, 74 and electronics compartment 48 in an upper portion of the welding machine 10 allows access to the starting battery 32 and battery compartment 26 to be provided at the front of the machine. Further, placing the vents 72, 74 above the base 12 reduces the likelihood that contaminants, such as dirt, rain, or snow, will be sucked into the welding machine 10. Engine noise emitted through the recessed side vents 72, 74 will tend to propagate away from the front of the welding machine 10 and away from an operator located at the front of the welding machine.

Figure 12:
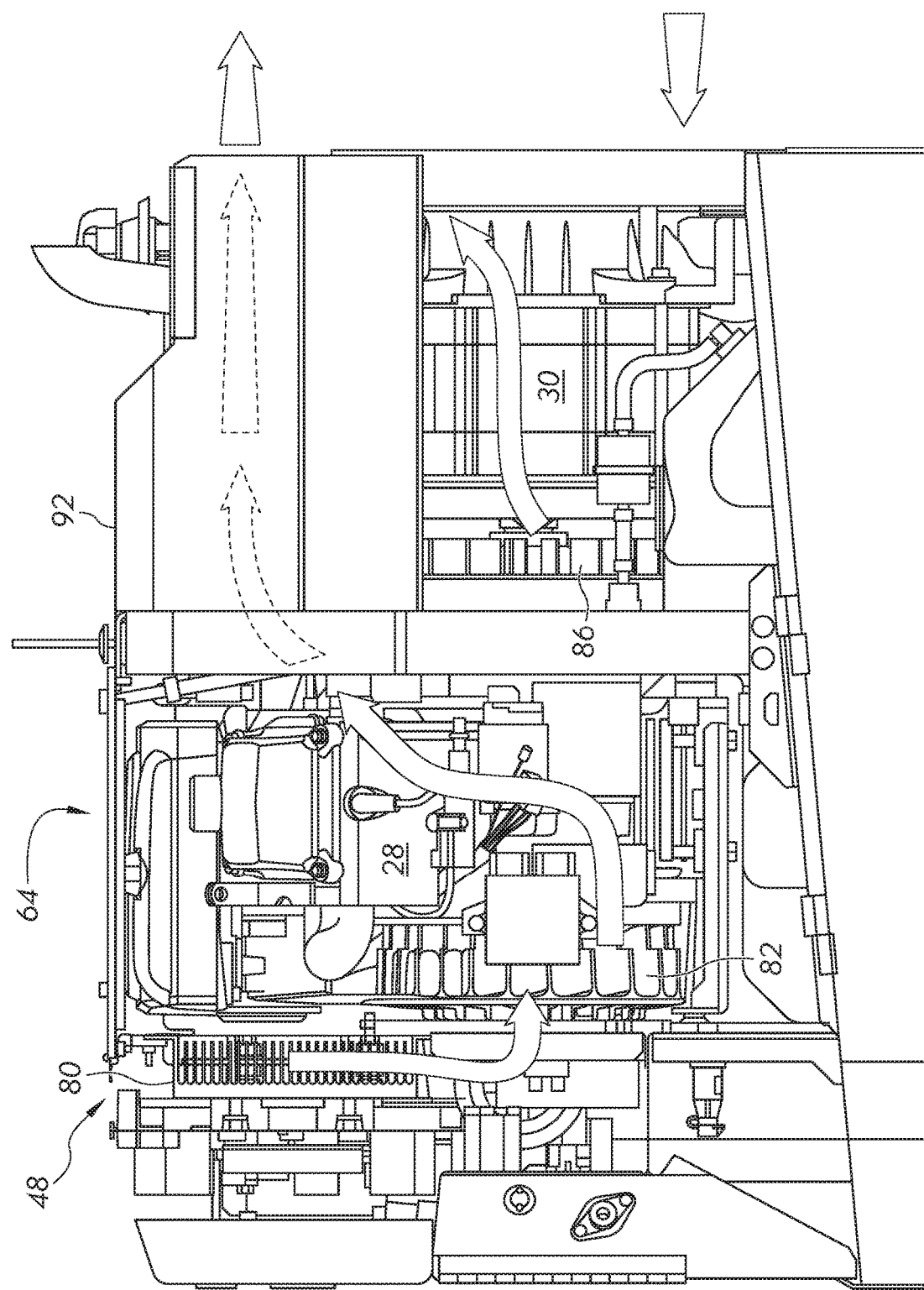
FIG. 12 is a right side internal view of the engine driven welder.
Figure 13:
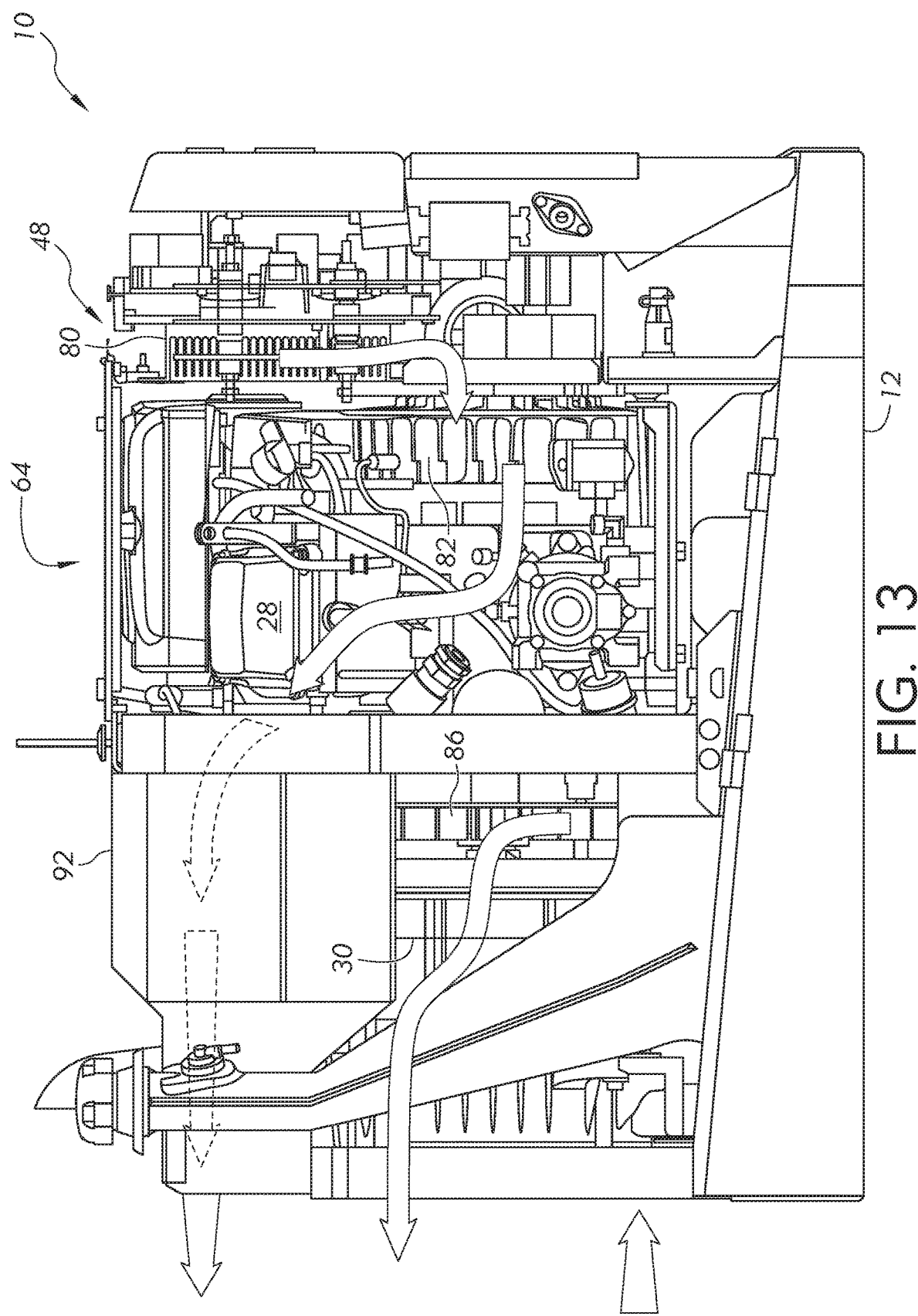
FIG. 13 is a left side internal view of the engine driven welder.

FIGS. 12 and 13 provide internal views of the welding machine 10 and show air flow paths through the machine for cooling purposes. Cooling air flows into, through and out of the welding machine are shown schematically by arrow in FIGS. 10-13. In certain embodiments, one or both of the recessed vents 72, 74 are aligned with welding power supply heat sinks 80 located in the electronics compartment 48, to cool various components of the welding power supply 34. The heat sinks 80 can be located directly in front of the vents 72, 74 or at another location in an air flow path within the electronics compartment 48. The vents 72, 74 can be aligned with other components of the welding power supply 34, such as a rectifier for example.

The engine 28 can include an engine-cooling fan 82 coupled to the engine. The engine compartment 64 is in fluid communication with the electronics compartment 48. When driven by the engine 28, the engine-cooling fan 82 pulls air axially from the electronics compartment 48 into the engine compartment 64 to cool the engine 28 and muffler 66, and such air drawn from the electronics compartment is replaced by external air through the recessed side vents 72, 74 that are open to the electronics compartment. As shown schematically by arrow in FIGS. 12 and 13, cooling air is drawn directly into the electronics compartment 48 (e.g., across the heat sink 80) by the engine-cooling fan 82. The cooling air flows into the electronics compartment 48 in a forward direction (rear to front), then downward through the electronics compartment, and then rearward from the electronics compartment into the engine compartment 64, to cool the engine 28 and muffler 66. Thus, the cooling air flow created by the engine-cooling fan 82 cools each of the welding power supply 34, the engine 28 and the muffler 66 in that order. In certain embodiments, the enclosure 14 can include additional air intake vents to cool the engine 28. For example, the battery compartment 26 would be on the low pressure side of the engine fan 82, and vents in fluid communication with the battery compartment could be provided on the enclosure 14 to provide additional cooling air flow to the engine 28.

Air is expelled from the engine compartment 64 through discharge vents 84 in the sides and/or rear of the outer case 14. See FIGS. 10 and 11. The discharge vents 84 can also be located in the upper two-thirds or upper half of the outer case 14. Discharging the cooling air at the top of the welding machine 10 helps to project engine noise upwards and away from the operator.

It can be seen in FIGS. 12 and 13 that the generator 30 includes a generator-cooling fan 86 that is coupled to the generator. The generator-cooling fan 86 can be located at the front side of the generator 30, adjacent to the engine 28, to pull air axially through the generator to cool the generator. The generator-cooling fan 86 draws external air into the enclosure 14 and generator 30 through an intake vent 88 (FIGS. 10 and 11). The intake vent 88 can be located on a rear side of the enclosure 14 so that cooling air is drawn forward into the generator 30. The engine compartment 64 will be pressurized by the engine-cooling fan 82 and the generator-cooling fan 86, and the cooling air flows will be pushed from the enclosure 14 through the discharge vents 84 by the fans. To direct cooling air into the generator 30, the welding machine 10 can include a relatively short sealing duct 90 (FIG. 14) that extends from the generator 30 (e.g., extends rearward) and seals against the inner surface of the enclosure 14 around the intake vent 88. The cooling air flow created by the generator-cooling fan 86 is shown schematically in FIGS. 12 and 13.

Figure 14:
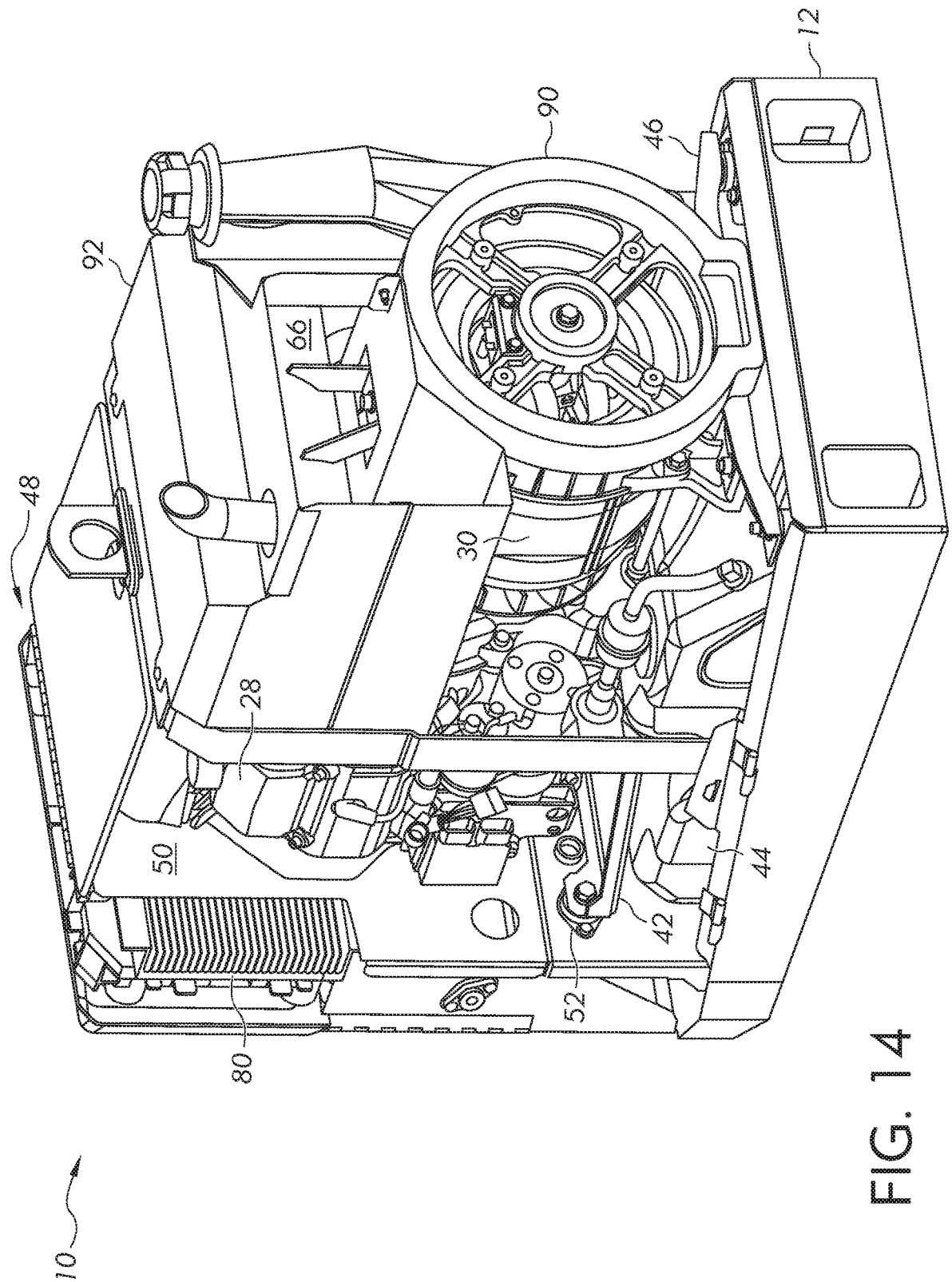
FIG. 14 is an internal view of the engine driven welder.

The cooling air flow created by the engine-cooling fan 82 also cools the muffler 66. However, the cooling air flow created by the generator-cooling fan 86 does not cool the muffler 66. As best seen in FIG. 14, a baffle 92 is located in the engine compartment 64 adjacent to the muffler 66. The baffle 92 partially surrounds the muffler 66 and separates the cooling air flow created by the generator fan 86 from the cooling air flow created by the engine fan 82. The baffle 92 directs the cooling air flow created by the generator fan 86 away from the muffler 66. A portion of the cooling air flow created by the engine fan 82 flows inside of the baffle 92 and around the muffler 66 and out of the discharge vents 84. Thus, the baffle 92 can serve as an air channel for the cooling air flow from the engine fan 82. The filler tube for the fuel tank 44 can be an obstruction for the baffle 92, and the baffle can be tapered, bent or otherwise oriented around the filler tube as shown.

In certain embodiments, the engine 28 can draw combustion air from the electronics compartment 48, in addition to its cooling air. The air in the electronics compartment 48 may be cooler than the air in the engine compartment 64. Cooler combustion air allows the engine 28 to operate more efficiently and increases its power output. Drawing combustion air from the electronics compartment 48 can also improve the cooling of the welding power supply 34 by increasing the amount of air removed from the electronics compartment 48.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A welding machine, comprising:
   an enclosure;
   a welding power supply mounted in an electronics compartment within the enclosure;
   a divider wall that at least partially defines an engine compartment of the welding machine rearward of the electronics compartment;
   a generator operatively connected to the welding power supply to supply electrical energy to the welding power supply;
   an internal combustion engine located within the engine compartment and configured to drive the generator;
   an engine-cooling fan coupled to the engine;
   a first recessed side vent in fluid communication with the electronics compartment and recessed in a first lateral side of the enclosure, and a first recessed air channel formed by the first lateral side of the enclosure and extending rearward from the first recessed side vent along the engine compartment; and
   a second recessed side vent in fluid communication with the electronics compartment and recessed in a second lateral side of the enclosure, and a second recessed air channel formed by the second lateral side of the enclosure and extending rearward from the second recessed side vent along the engine compartment,
   wherein the engine-cooling fan draws cooling air forward through the first and second recessed side vents and into the electronics compartment, and downward through the electronics compartment and into the engine compartment.

2. The welding machine of claim 1, further comprising:
   a generator-cooling fan coupled to the generator;
   a rear vent in fluid communication with the generator and located on a rear side of the enclosure; and
   a baffle at least partially surrounding the muffler, wherein the generator-cooling fan draws further cooling air forward into the enclosure through the rear vent, and the baffle directs an air flow of the further cooling air away from the muffler.

3. The welding machine of claim 1, further comprising:
   a cantilevered engine-mounting shelf cantilevered from the divider wall, wherein the internal combustion engine is attached to the cantilevered engine-mounting shelf; and
   a fuel tank mounted within the enclosure and located beneath each of the cantilevered engine-mounting shelf, the internal combustion engine, and the generator.

4. The welding machine of claim 1, wherein the welding power supply includes a heat sink aligned with at least one of the first recessed side vent and the second recessed side vent.

5. The welding machine of claim 1, wherein the enclosure includes a first engine compartment access door located beneath the first recessed air channel, and a second engine compartment access door located beneath the second recessed air channel.

6. The welding machine of claim 1, wherein the divider wall is located between the internal combustion engine and a starting battery for starting the internal combustion engine, and the divider wall separates the engine compartment from a battery compartment storing the starting battery.

7. The welding machine of claim 6, further comprising a removable battery compartment cover for providing access to the battery compartment, wherein the battery compartment cover is located on a front side of the welding machine.

8. A welding machine, comprising:
an enclosure;
a welding power supply mounted in an electronics compartment within the enclosure;
a divider wall that at least partially defines an engine compartment of the welding machine rearward of the electronics compartment;
a generator operatively connected to the welding power supply to supply electrical energy to the welding power supply;
an internal combustion engine located within the engine compartment and configured to drive the generator;
a muffler;
an engine-cooling fan coupled to the engine for drawing a first cooling air flow into the enclosure;
a generator-cooling fan coupled to the generator for drawing a second cooling air flow into the enclosure;
a first recessed side vent in fluid communication with the electronics compartment and recessed in a first lateral side of the enclosure, and a first recessed air channel formed by the first lateral side of the enclosure and extending rearward from the first recessed side vent along the engine compartment;
a second recessed side vent in fluid communication with the electronics compartment and recessed in a second lateral side of the enclosure, and a second recessed air channel formed by the second lateral side of the enclosure and extending rearward from the second recessed side vent along the engine compartment;
a further vent in fluid communication with the generator; and
a baffle located in the engine compartment adjacent to the muffler,
wherein the engine-cooling fan draws the first cooling air flow forward through the first and second recessed side vents and into the electronics compartment, and downward through the electronics compartment and into the engine compartment thereby cooling each of the welding power supply, the engine, and the muffler, and the generator-cooling fan draws the second cooling air flow into the enclosure through the further vent, and
wherein the baffle directs the second cooling air flow away from the muffler.

9. The welding machine of claim 8, wherein the baffle at least partially surrounds the muffler.

10. The welding machine of claim 8, further comprising:
a cantilevered engine-mounting shelf cantilevered from the divider wall, wherein the internal combustion engine is attached to the cantilevered engine-mounting shelf; and
a fuel tank mounted within the enclosure and located beneath each of the cantilevered engine-mounting shelf, the internal combustion engine, and the generator.

11. The welding machine of claim 8, wherein the welding power supply includes a heat sink aligned with at least one of the first recessed side vent and the second recessed side vent.

12. The welding machine of claim 8, wherein the enclosure includes a first engine compartment access door located beneath the first recessed air channel, and a second engine compartment access door located beneath the second recessed air channel.

13. The welding machine of claim 8, wherein the divider wall is located between the internal combustion engine and a starting battery for starting the internal combustion engine, and the divider wall separates the engine compartment from a battery compartment storing the starting battery.

14. The welding machine of claim 13, further comprising a removable battery compartment cover for providing access to the battery compartment, wherein the battery compartment cover is located on a front side of the welding machine.

15. An electrical power generation apparatus, comprising:
an arc generation power supply mounted in an electronics compartment of the apparatus;
a generator operatively connected to the arc generation power supply to supply electrical energy to the arc generation power supply;
an internal combustion engine configured to drive the generator;
an enclosure including a chassis structure comprising a divider wall that at least partially defines an engine compartment of the welding machine;
a cantilevered engine-mounting shelf cantilevered from the divider wall, wherein the internal combustion engine is attached to the cantilevered engine-mounting shelf;
a fuel tank mounted within the chassis structure and located beneath each of the cantilevered engine-mounting shelf, the internal combustion engine, and the generator;
an engine-cooling fan coupled to the internal combustion engine for drawing a cooling air flow into the enclosure;
a recessed side vent in fluid communication with the electronics compartment and recessed in a lateral side of the enclosure, wherein the engine-cooling fan draws cooling air forward through the recessed side vent and into the electronics compartment, and downward through the electronics compartment and into the engine compartment; and a vibration isolator that isolates the cantilevered engine-mounting shelf from the divider wall, wherein the internal combustion engine and cantilevered engine-mounting shelf apply a radial load to the vibration isolator.

16. The electrical power generation apparatus of claim 15, wherein the arc generation power supply includes a heat sink aligned with the recessed side vent.

17. The electrical power generation apparatus of claim 15, wherein the divider wall is located between the internal combustion engine and a starting battery for starting the internal combustion engine, and the divider wall separates the engine compartment from a battery compartment storing the starting battery.

18. The electrical power generation apparatus of claim 17, further comprising a removable battery compartment cover for providing access to the battery compartment, wherein the battery compartment cover is located on a front side of the apparatus, and the electronics compartment is located above the battery compartment.

19. The electrical power generation apparatus of claim 15, further comprising a recessed air channel formed by the lateral side of the enclosure and extending rearward from the recessed side vent along the engine compartment.

20. The electrical power generation apparatus of claim 19, wherein the enclosure includes an engine compartment access door located beneath the recessed air channel.

* * * * *